Oct. 25, 1960 V. L. HELGESON 2,957,535
VEHICLE STEERING CONTROL SYSTEM WITH LATERAL ACCELERATION COMPUTER
Filed Nov. 25, 1957
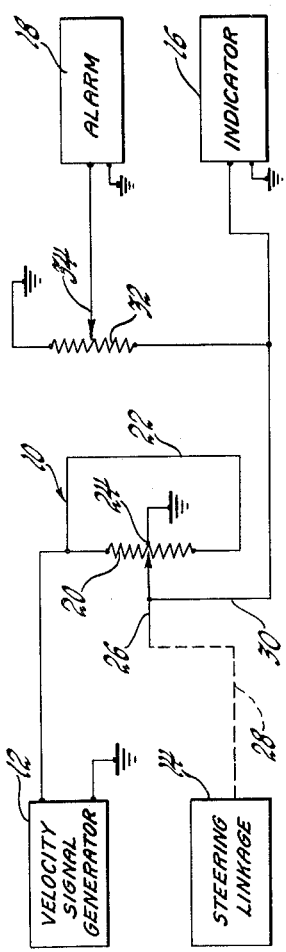
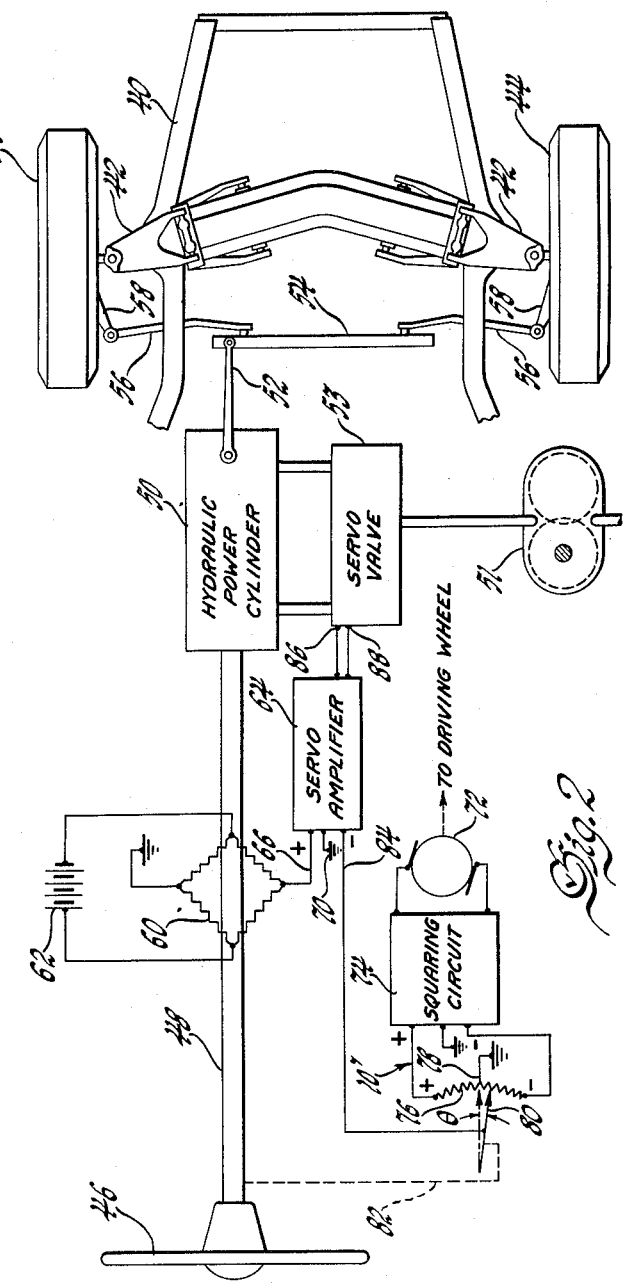
INVENTOR.
*Virgil L. Helgeson*
BY
*E. W. Christen*
ATTORNEY 2,957,535
Patented Oct. 25, 1960

United States Patent Office

2,957,535
VEHICLE STEERING CONTROL SYSTEM WITH LATERAL ACCELERATION COMPUTER

Virgil L. Helgeson, Milwaukee, Wis., assignor to General Motors Corporation, Detroit, Mich., a corporation of Delaware Filed Nov. 25, 1957, Ser. No. 698,716

5 Claims. (Cl. 180—79.2)

This invention relates to steering control for self-propelled vehicles and more particularly to means for developing a signal corresponding to the lateral acceleration of the vehicle.

In motor vehicle operation, proper steering control requires driver response to lateral acceleration of the vehicle whether caused by external disturbances or by deliberate driver effort. The permissible limits of lateral acceleration and the corrective action required are variable quantities difficult to evaluate by subjective reaction even by highly skilled drivers. Some measure of lateral acceleration is sensed in manual steering systems by the dirigible wheel position information imparted to the driver by road forces exerted on the dirigible wheels and transmitted through the steering system. To a lesser extent, this "feel" is imparted to the driver through the present-day power steering systems.

In either case, it is desired to provide an objective measurement of the lateral acceleration and to warn the driver of excessive values which might result in vehicle skid or loss of control. This is accomplished in accordance with this invention by computing the instantaneous value of lateral acceleration. This computation is preferably effected by generating a signal quantity corresponding to a function of vehicle velocity and multiplying this quantity by the angular displacement of the dirigible wheels. The lateral acceleration signal thus derived is applied to a suitable indicator, alarm, or control system. It is also desirable to permit adjustment of the limiting value of lateral acceleration in accordance with different conditions of the roadway, tires, and desired vehicle operation. In case of sustained and monotonous driving, it may be desired to adjust the limit to a very low value so that any turn of the vehicle resulting from inattention or the like would result in appropriate correction or warning. This is accomplished by providing an adjustable attenuator between the acceleration computer and the indicator, alarm, or control system.

In certain conditions of vehicle operation, the driver is without sufficient information to make the proper corrective action necessitated by lateral acceleration. For example, in the case of an incipient skid, the road forces which normally give the driver front wheel position information tend to disappear and the proper turn for corrective action is unknown. Also in the case of a sudden side wind the road forces develop too late to permit the driver to overcome the disturbance. It is therefore desired to correct the disturbance independently of the driver's effort and to indicate to the driver the proper corrective action to be taken. This is accomplished by utilizing the lateral acceleration signal to apply a force to the steering shaft through a suitable servo system. Thus the free control (hands off) stability of the vehicle is enhanced and an artificial feel is imparted to the driver which apprises him of the proper corrective action.

A more complete understanding of this invention may be had from the detailed description which follows taken with the accompanying drawings in which:

Figure 1 is a schematic diagram of this invention embodied in an indicator and warning system; and Figure 2 is a schematic diagram of this invention embodied in a vehicle having a power steering system.

The illustrative embodiment of the invention in a steering control system, as represented in Figure 1, is adapted for use with a self-propelled vehicle having any conventional steering system. In general, the control system comprises an acceleration computer 10 which receives input data from a velocity signal generator 12 and the steering linkage 14 of the vehicle. An acceleration signal developed by the computer 10 is applied to suitable utilization devices such as the indicator 16 and the alarm 18.

Before proceeding with a more detailed description of the system, it will be helpful to consider the mathematical relationship involved in deriving an acceleration signal. It is well known that the lateral acceleration of a body moving on an arcuate path of radius R with a linear velocity V is given by the expression $$a = \frac{V^2}{R} \qquad (1)$$

The radius of curvature R of the path described by a vehicle having its dirigible wheels displaced from the straight-ahead position by a steering angle $\theta$ is:

$$R = \frac{k_1}{\theta} \qquad (2)$$

where $k_1$ is a constant of proportionality. Substituting this expression for radius of curvature into Equation 1 yields the following expression for lateral acceleration:

$$a = \frac{V^2 \theta}{k_1} \qquad (3)$$

This expression for lateral acceleration is mechanized by a multiplying circuit having input signals corresponding to the radius of curvature and the square of vehicle velocity. The radius of curvature signal quantity R is readily developed as a mechanical displacement by a suitable linkage with any convenient part of the steering mechanism. The signal quantity $V^2$ may be readily developed as an electrical signal by the use of well known velocity transducers or pick-offs. For example, a tachometer generator may be connected with the propeller shaft or driving wheels of the vehicle to develop a velocity voltage V from which the quantity $V^2$ is developed by any suitable squaring circuit. Numerous squaring circuits are well known such as the vacuum tube amplifier biased so that its operating range falls on the curved portion of the grid-voltage, plate-current characteristic curve, and such as the servo multiplier circuit. Otherwise, the signal quantity $V^2$ may be derived directly from a direct current, shunt field generator having its field excitation restricted below the saturation value. Where mathematical accuracy is important, it is preferred to utilize the term $V^2$ in deriving the lateral acceleration value. However, it is recognized that in many applications of this invention the requirements of economy and simplicity will militate against the use of the components required for developing the term $V^2$. In such applications, the necessary degree of accuracy is obtained by using the first power of the velocity signal thus requiring only a simple tachometer generator or the like. In such cases, the utilization apparatus, such as the indicator, may be appropriately calibrated to compensate for the departure from the mathematical expression for lateral acceleration. Therefore, throughout the specification and claims the expression "a predetermined function of velocity" is employed to mean an approximation to the second power of linear velocity.

Referring again to Figure 1, the system comprises a potentiometer 20 having its terminals connected together by a conductor 22 and having its center tap 24 connected to a point of reference potential or ground. A velocity signal generator 12 has one of its output terminals connected to the common terminals of the potentiometer 20 and its other output terminal connected to ground. Thus the potentiometer 20 is excited with a signal voltage corresponding to the velocity of the vehicle. The movable contact 26 of the potentiometer 20 is connected through a suitable linkage 28 to the steering mechanism or linkage 14 of the vehicle steering system. The movable contact 26 occupies a reference position, with the vehicle dirigible wheels straight-ahead, which coincides with the center tap 24. The movable contact 26 is electrically connected by conductor 30 directly to the indicator 16 which is suitably a proportional type indicator such as a moving coil instrument having a scale calibrated in terms of lateral acceleration. Connected between the movable contact 26 and ground is an attenuator or potentiometer 32 having a movable contact 34 connected to an alarm 18 such as a buzzer or signal lamp.

In operation of the system of Figure 1, the velocity signal voltage V is applied across the potentiometer 20 and the movable contact 26 is displaced in accordance with the steering angle $\theta$ of the vehicle. Accordingly, the voltage developed on the movable contact 26 corresponds to the lateral acceleration of the vehicle and is applied directly to indicator 16. As previously mentioned, the indicator will provide the operator with an indication of the value of lateral acceleration and he may regulate the sharpness of turns accordingly. In order to warn the driver of excessive lateral acceleration, the movable contact 34 is previously adjusted in accordance with roadway and tire conditions to energize the alarm 18 upon the occurrence of the desired limiting value of acceleration. For sustained and monotonous driving the movable contact 34 may be adjusted so that a very low value of acceleration will energize the alarm 18. Thus, a slight swerve of the vehicle due to inattention will alert the driver to the need for correction.

As shown in Figure 2, the inventive system may be incorporated in a power steering system for a self-propelled vehicle. In this illustrative embodiment, the vehicle frame 40 supports a pair of dirigible wheels 44 on a suitable suspension member 42. The manual steering wheel 46 is connected through a steering shaft 48 to a power actuator 50, suitably of that type shown in the copending application Serial No. 568,734 of William F. Milliken et al. filed March 1, 1956, now Patent No. 2,865,462, for "Automotive Vehicle Having Free Control and Stability Features" and assigned to the assignee of the present invention. In this arrangement, the manual effort is transmitted through the steering shaft 48 to the pitman arm 52 and a hydraulic servomotor included in the power actuator 50 provides power boost corresponding to the driver applied torque. The hydraulic servomotor included in the power actuator 50 is energized from a hydraulic pump 51 in accordance with the regulating action of the relay means or servo valve 53. The pitman arm 52 is pivotally connected with the drag link 54 of a conventional parallelogram steering linkage. The drag link is connected to each of the dirigible wheels 44 through the respective tie rods 56 and radius arms 58.

In order to control the power actuator 50 in accordance with the driver applied torque on the steering wheel 46, there is provided a steering signal generator such as a torque responsive transducer or pick-off associated with the steering shaft. This steering signal generator suitably comprises a strain gauge bridge 60 mounted on the steering shaft 48 and excited by a voltage source 62 connected across one pair of diagonal terminals of the bridge circuit. A steering signal voltage corresponding in amplitude and phase or polarity to the magnitude and direction of driver applied torque is developed across the other pair of diagonal terminals of the bridge circuit. This steering signal voltage is applied to the servo amplifier 64 across the input terminals 66 and 70.

In accordance with this invention, the control of the power actuator 50 is modulated by a lateral acceleration signal developed by the acceleration computer circuit 10'. The computer circuit comprises a tachometer generator 72 which is driven at a rotative speed corresponding to vehicle velocity by suitable connection with the vehicle driving wheel, as indicated. The voltage developed across the output terminals of the tachometer generator is applied to the squaring circuit 74 to develop a voltage across the output terminals thereof corresponding to the second power of vehicle velocity. The squaring circuit preferably includes a phase inverter for developing a double-ended or balanced-to-ground output voltage. The balanced-to-ground output voltages of the squaring circuit have the instantaneous phase or polarity relationship as indicated in the drawing and are applied across the terminals of the potentiometer 76. The common or ground terminal is connected to the center tap 78 of the potentiometer. The movable contact 80 of the potentiometer is mechanically connected with the steering shaft 48 through a suitable linkage 82 for displacement therewith in accordance with the steering angle $\theta$ of the dirigible wheels. The voltage developed between the movable contact 80 and ground corresponds in amplitude and phase or polarity to the magnitude and sense of lateral acceleration of the vehicle. This voltage is applied to the servo amplifier across the input terminals 84 and 70 thereof.

The servo amplifier 64 is adapted to combine the steering and acceleration signal voltages in an algebraic manner and to amplify the result control voltage for utilization in actuating the servo valve 53. These signal voltages are applied in phase opposition in the sense that a right hand turn, for example, will develop a steering signal of one phase or polarity while the same turn will develop an acceleration signal of the opposite polarity.

Thus the servo amplifier develops an output voltage which corresponds in amplitude and polarity to the algebraic sum of the input voltages and the output terminals are connected to the input terminals 86 and 88 of the servo valve. Accordingly, the servo valve controls the energization of the power actuator 50 in accordance with the amplitude and polarity of the servo amplifier output voltage.

In operation of the system of Figure 2, the lateral acceleration signal voltage will be of very small value for low speed maneuvers and will have a negligible effect during parking of the vehicle. In such slow speed maneuvers the steering signal predominates and, through the intermediary of the servo amplifier 64 and the servo valve 53, causes energization of the power actuator 50 in accordance with the driver applied torque. In the case of higher speed driving, the lateral acceleration signal will become appreciable and will effectively reduce the resultant control voltage developed by the servo amplifier and will thus reduce the energization of the power actuator 50. In a maneuver such as a high speed turn where the lateral acceleration of the vehicle is great, the acceleration signal will oppose the steering signal in such manner that the power actuator 50 reacts against the driver applied torque. In the extreme case of an incipient skid, the acceleration signal will predominate to afford steering correction through the power actuator and provide the operator with an artificial feel indicative of the proper corrective action necessary to maintain control of the vehicle. Similarly, in the case of a sudden gust of side wind the lateral acceleration signal will predominate and tend to correct the disturbance before the driver is able to react. Thus the free control and stability of the vehicle is greatly enhanced by the inventive system.

Although the description of this invention has been given with respect to a particular embodiment, it is not to be construed in a limiting sense. Numerous variations and modifications within the spirit and scope of this invention will now occur to those skilled in the art. For a definition of the invention, reference is made to the appended claims.

I claim:

1. In combination with a self-propelled vehicle having dirigible wheels which produce a vehicle turning radius corresponding only to the angular displacement of the dirigible wheels, a manually controlled steering mechanism connected with the dirigible wheels, a velocity signal generator for developing a signal voltage corresponding to a function of the vehicle velocity, electromechanical multiplying means having electrical input terminals connected with said generator and having a mechanical input member connected with said steering mechanism for developing a lateral acceleration voltage at its output terminals corresponding to the product of the velocity signal voltage and the displacement of the dirigible wheels, and utilization means connected with the output terminals of said circuit means.

2. In combination with a self-propelled vehicle having dirigible wheels which produce a vehicle turning radius corresponding only to the angular displacement of the dirigible wheels, a manually controlled steering mechanism connected with the dirigible wheels, a velocity signal generator for developing a signal voltage corresponding to a function of the vehicle velocity, a potentiometer connected across said generator for excitation thereby and having its movable contact connected with said mechanism for displacement thereby to develop a voltage on said movable contact corresponding in amplitude to the lateral acceleration of said vehicle, and utilization means connected electrically with said movable contact.

3. In combination with a self-propelled vehicle having dirigible wheels which produce a vehicle turning radius corresponding only to the angular displacement of the dirigible wheels, a manually controlled steering mechanism connected with the dirigible wheels, a velocity signal generator for developing a signal voltage corresponding to a function of vehicle velocity, a potentiometer having a common connection of its terminal ends and a center tap connected across said generator for excitation thereby, the movable contact of said potentiometer being connected with said mechanism for displacement thereby to develop a voltage between said movable contact and said center tap corresponding to the lateral acceleration of said vehicle, and utilization means connected across said movable contact and said center tap.

4. In combination with a self-propelled vehicle having dirigible wheels which produce a vehicle turning radius corresponding only to the angular displacement of the dirigible wheels, a manually controlled steering mechanism connected with the dirigible wheels, a velocity signal generator for developing a balanced-to-ground signal voltage across its output terminals corresponding in amplitude to a function of vehicle velocity, a potentiometer having its terminals connected across the output terminals and having a center tap connected to ground, the movable contact of said potentiometer being connected with said mechanism for displacement thereby to develop a voltage between said movable contact and ground corresponding in amplitude and phase to the lateral acceleration of said vehicle, and utilization means connected across said movable contact and ground.

5. In combination with a self-propelled vehicle having dirigible wheels which produce a vehicle turning radius corresponding only to the angular displacement of the dirigible wheels, a steering mechanism including a power actuator connected with said wheels, a manual control for said power actuator including a steering signal generator for developing across its output terminals a steering signal voltage corresponding in amplitude and phase to the magnitude and direction of manual effort exerted on said manual control, a velocity signal generator for developing a balanced-to-ground signal voltage across its output terminals corresponding in amplitude to a function of vehicle velocity, a potentiometer having its terminals connected across said output terminals and having a center tap connected to ground, the movable contact of said potentiometer being mechanically connected with said mechanism for displacement thereby, the movable contact and ground constituting output terminals of said potentiometer for deriving an acceleration voltage corresponding in amplitude and phase to the lateral acceleration of said vehicle, a differential amplifier connected with the output terminals of said steering signal generator and with the output terminals of said potentiometer for algebraically combining said steering and acceleration signal voltages to derive a control voltage, relay means connected between said amplifier and said power actuator and responsive to said control voltage for regulating the extent and direction of energization of said power actuator.

References Cited in the file of this patent

UNITED STATES PATENTS

| | | |
|---|---|---|
| 2,339,291 | Paulus et al. | Jan. 18, 1944 |
| 2,392,293 | Ruge | Jan. 1, 1946 |
| 2,493,755 | Ferrill | Jan. 10, 1950 |
| 2,548,397 | Schaevitz | Apr. 10, 1951 |
| 2,701,873 | Bard | Feb. 8, 1955 |
| 2,754,465 | Brier | July 10, 1956 |
| 2,798,567 | Staude | July 9, 1957 |
| 2,851,795 | Sherman | Sept. 16, 1958 |